(12) United States Patent  
Cunningham (10) Patent No.: US 7,296,819 B2  
(45) Date of Patent: Nov. 20, 2007

(54) REVERSIBLE RUNNING STROLLER

(76) Inventor: Robert Thomas Brent Cunningham, 12 Kenilworth Dr. East, Stamford, CT (US) 06902

( * ) Notice: Subject to any disclaimer, the term of this patent is extended or adjusted under 35 U.S.C. 154(b) by 173 days.

(21) Appl. No.: 10/249,792

(22) Filed: May 8, 2003

(65) Prior Publication Data

US 2004/0222606 A1    Nov. 11, 2004

(51) Int. Cl.
  *B62B 7/00* (2006.01)
(52) U.S. Cl. ............... 280/642; 280/647; 280/47.39
(58) Field of Classification Search ........... 280/642, 280/643, 644, 647, 648, 650, 47.38, 47.39, 280/47.4, 47.41
  See application file for complete search history.

(56) References Cited

U.S. PATENT DOCUMENTS

| | | | | | |
|---|---|---|---|---|---|
| 144,166 | A | * | 10/1873 | Towers | ............ 280/8 |
| 1,262,904 | A | * | 4/1918 | Ambler | ............ 280/47.39 |
| 4,398,748 | A | * | 8/1983 | Duvignacq | ............ 280/644 |
| 5,188,389 | A | * | 2/1993 | Baechler et al. | ............ 280/650 |
| 5,476,275 | A | * | 12/1995 | Baechler et al. | ............ 280/47.38 |
| 5,934,757 | A | * | 8/1999 | Smith | ............ 297/452.13 |
| 6,017,051 | A | * | 1/2000 | Thimmig | ............ 280/642 |
| 6,193,263 | B1 | * | 2/2001 | Lin | ............ 280/643 |
| 6,299,194 | B1 | * | 10/2001 | Chen | ............ 280/642 |
| 6,443,467 | B1 | * | 9/2002 | Black | ............ 280/47.38 |
| 6,513,827 | B1 | * | 2/2003 | Barenbrug | ............ 280/648 |
| 6,530,591 | B2 | * | 3/2003 | Huang | ............ 280/650 |
| 6,533,310 | B2 | * | 3/2003 | O'Shea et al. | ............ 280/644 |
| 6,722,689 | B2 | * | 4/2004 | Kreamer | ............ 280/642 |
| 6,767,028 | B2 | * | 7/2004 | Britton et al. | ............ 280/644 |
| 6,886,839 | B2 | * | 5/2005 | Everett | ............ 280/62 |

FOREIGN PATENT DOCUMENTS

| | | | |
|---|---|---|---|
| EP | 339890 A2 | * | 11/1989 |
| EP | 422812 A1 | * | 4/1991 |
| GB | 2186793 A | * | 8/1987 |

* cited by examiner

*Primary Examiner*—Christopher Bottorff (57) ABSTRACT

A three-wheeled jogging stroller with demountable wheels, a removable seat, a collapsible frame assembly, and a reversing directional seat. The frame assembly in a collapsed condition with the demountable wheels in a demounted condition allow for transportation and storage. The reversing directional seat made up of pivotally connected tubular portions allow for the rider to face forward or backward to the direction of travel at varied reclining angles.

2 Claims, 7 Drawing Sheets

REVERSIBLE RUNNING STROLLER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF INVENTION

1. Field of Invention

This invention relates to strollers, particularly to such strollers used for jogging or running.

2. Background of the Invention

Running strollers are conventionally configured with a seating area for the infant and three wheels that can be utilized while running or jogging. Such vehicles are referred to as jogging strollers, whereby the parent, or other person, while pushing the infant therein, may conveniently exercise by jogging, or even running.

Originally, running strollers only had a forward facing seat. This made it difficult for the person pushing the stroller to see the rider in the seat. This forward facing arrangement was the only option for running stroller users. This configuration limits the versatility and safety of running strollers. Since the person pushing the stroller can't see the child face to face, the ability to easily check on each other is limited. This checking up is especially needed when the rider is a small infant and needs constant care and attention by an adult. Previous running strollers were designed so that the rider can face forward, into cold wind etc., for children that want to see what is before them but did not design for the need of the adult to be able to see and care for the child.

SUMMARY

In accordance with an aspect of the invention, there is provided a jogging stroller with removable wheels, a collapsible frame, and a reversing directional seat which may be readily assembled and disassembled, which stroller is compact, stable and lightweight.

Accordingly, several object and advantages of my invention are the ability to have the rider face to the rear. This allows the one pushing the stroller to see face to face with the rider. In addition, if the rider would like to face forward, this option is also easily available. Since the running stroller is reversible, the rider can face forward or rearward. Facing to the rear, the rider can avoid cold wind. Facing to the front, the rider can see before him. In addition, my invention allows for the ability to have the rider seated at varied degrees of reclining. This lets younger children that have less support of their head to be totally or partially reclined and for older children to sit up.

DESCRIPTION OF THE PREFERRED EMBODIMENT

Referring now to the drawings, and particularly to FIGS. 1, 2, 5, and 6 there is shown a multi-wheeled jogging stroller, generally designated 40, which includes a frame assembly, generally designated 42; angled tubes 7a, 7b, wheels 2-4, a handlebar assembly, generally designated 20, 6, and a seat 15.

Figure 2:
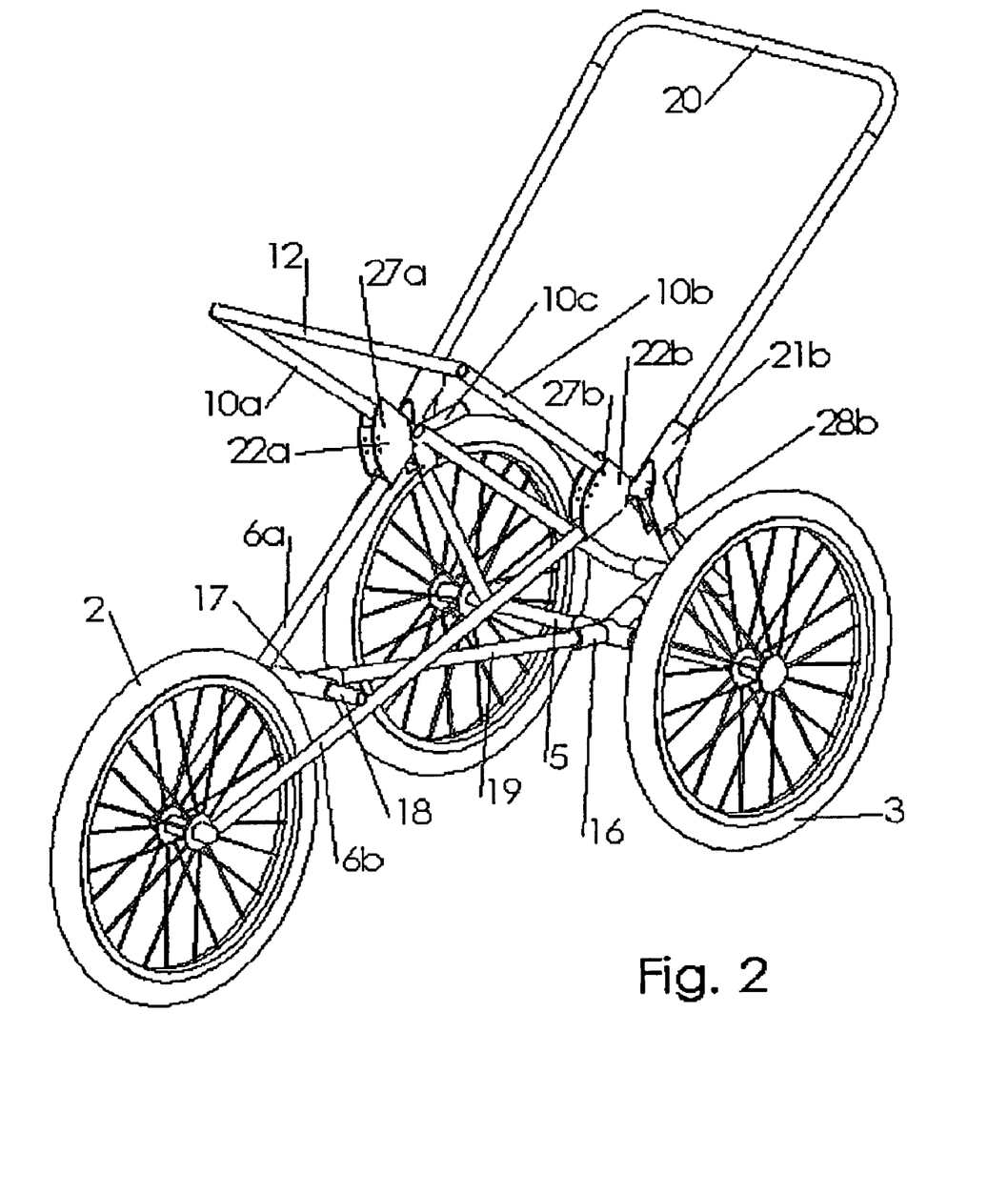
FIG. 2 is a perspective view of the collapsible frame of the stroller of FIG. 1 with the upper seat members rotated for rear facing direction of the rider.
Figure 3:
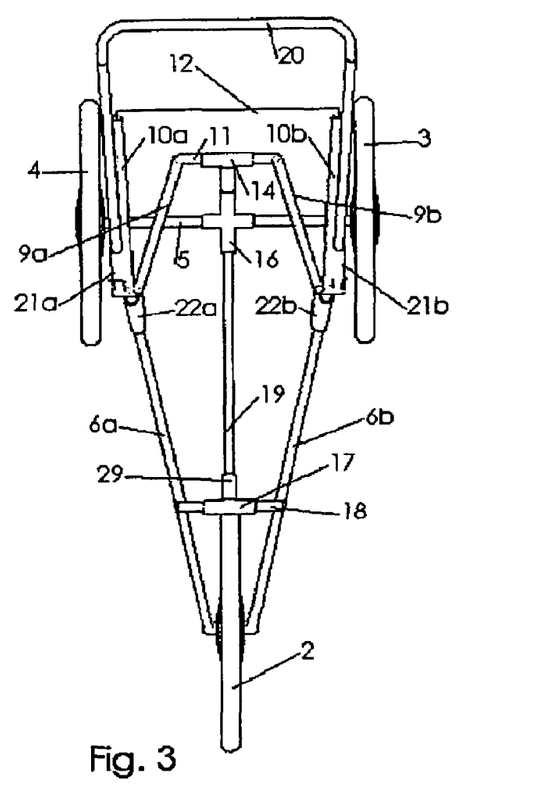
FIG. 3 is a top plan view of the collapsible frame of FIG. 1.
Figure 4:
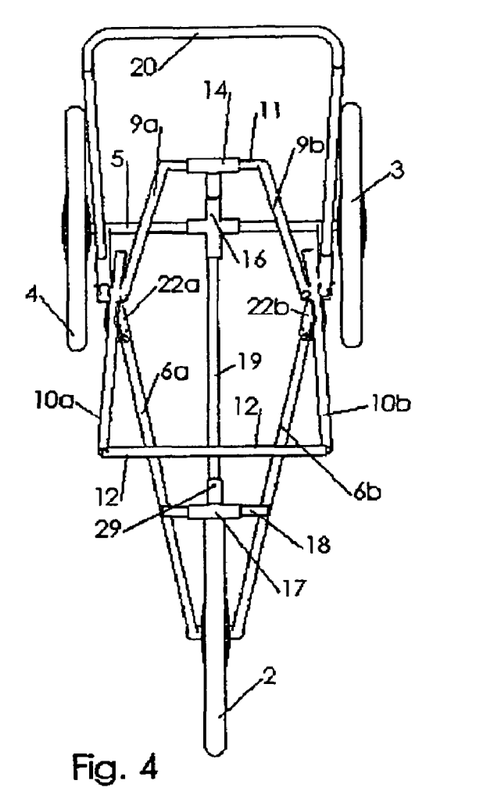
FIG. 4 is a top plan view of the collapsible frame of FIG. 1 in the rear facing seat configuration.
Figure 5:
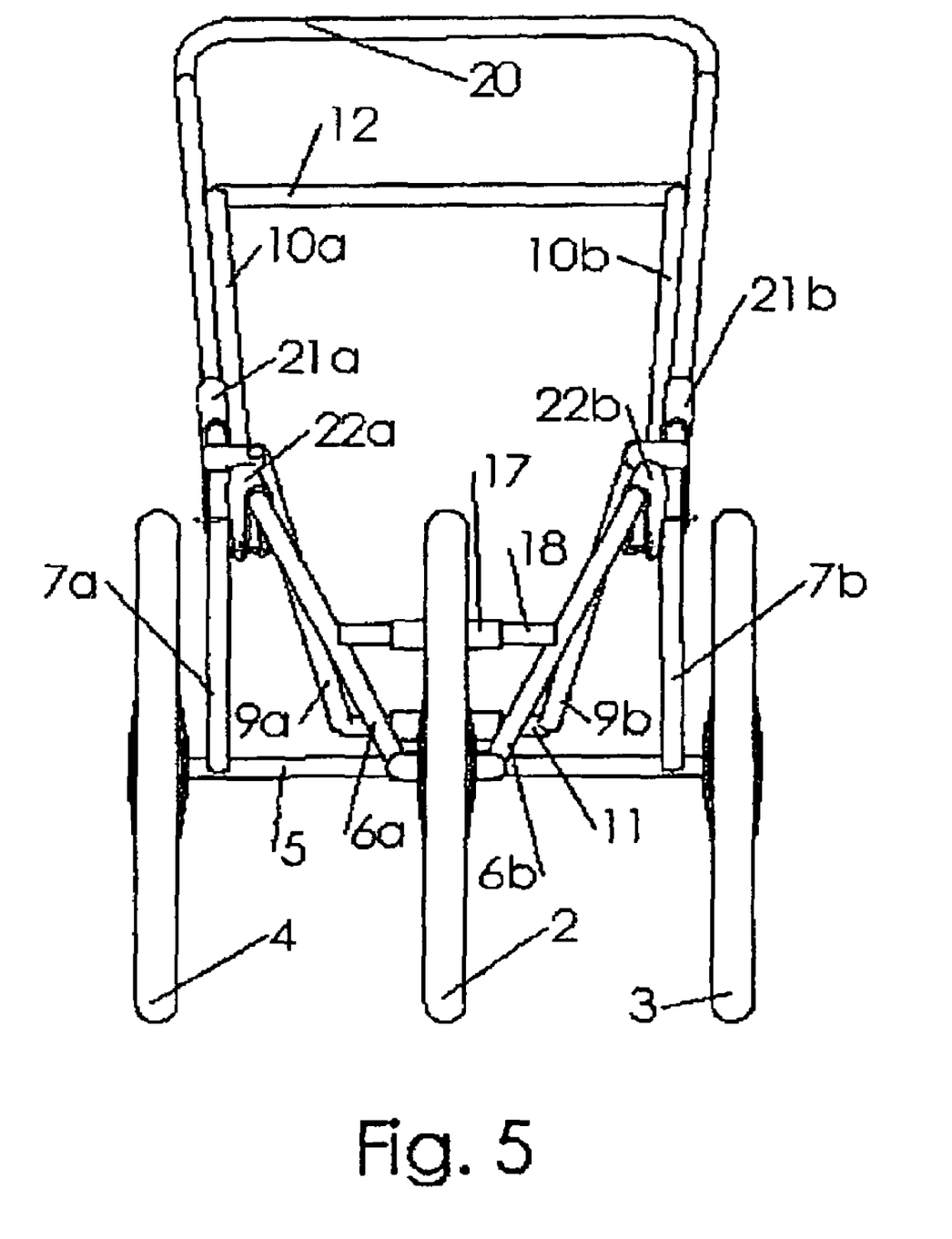
FIG. 5 is a front elevational view of the collapsible frame of FIG. 1.

As best shown in FIGS. 2 and 3, the wheel support assembly 42 includes a rear axle assembly 5. The rear wheels 3, 4, as will be hereinafter described, include detachable axle stubs which are attached to opposite ends of the rear axle assembly 5.

At the distal free ends, the upright tubes 7, the handlebar 20, handle tubes 6, upper seat tubes 10, and lower food support tubes 9, are pivotally coupled together, such as by machine screw member or other such coupler. This pivot allows the upper seat members 10, to rotate relative to the plane formed by the three points of contact of the wheels with the ground so that the seat 15, turns inward and outward as seen best in FIGS. 6 and 7. This turning allows for forward FIG. 1, or rear facing FIG. 2, of the rider.

FIGS. 1, 2, 6, and 7 depict handlebar support members 21a and 21b, handlebar support members may be made of a tubular section and a saddle-shaped member wherein the tubular section of the handlebar support member encircles the handlebar tube 20. The end of the angled tubes 7a and 7b, is positioned in the bight portion of the saddle-shaped member and releasably attached thereto with a removable pin 28 or similar such attachment. The handlebar supports 21a and 21b is formed with an angle between the tubular section and the saddle-shaped member such that when engaged with the handlebar and angled tube, there is an angle between the two tubes and therefore supports the handlebar at a usable and adjustable height.

Figure 1:
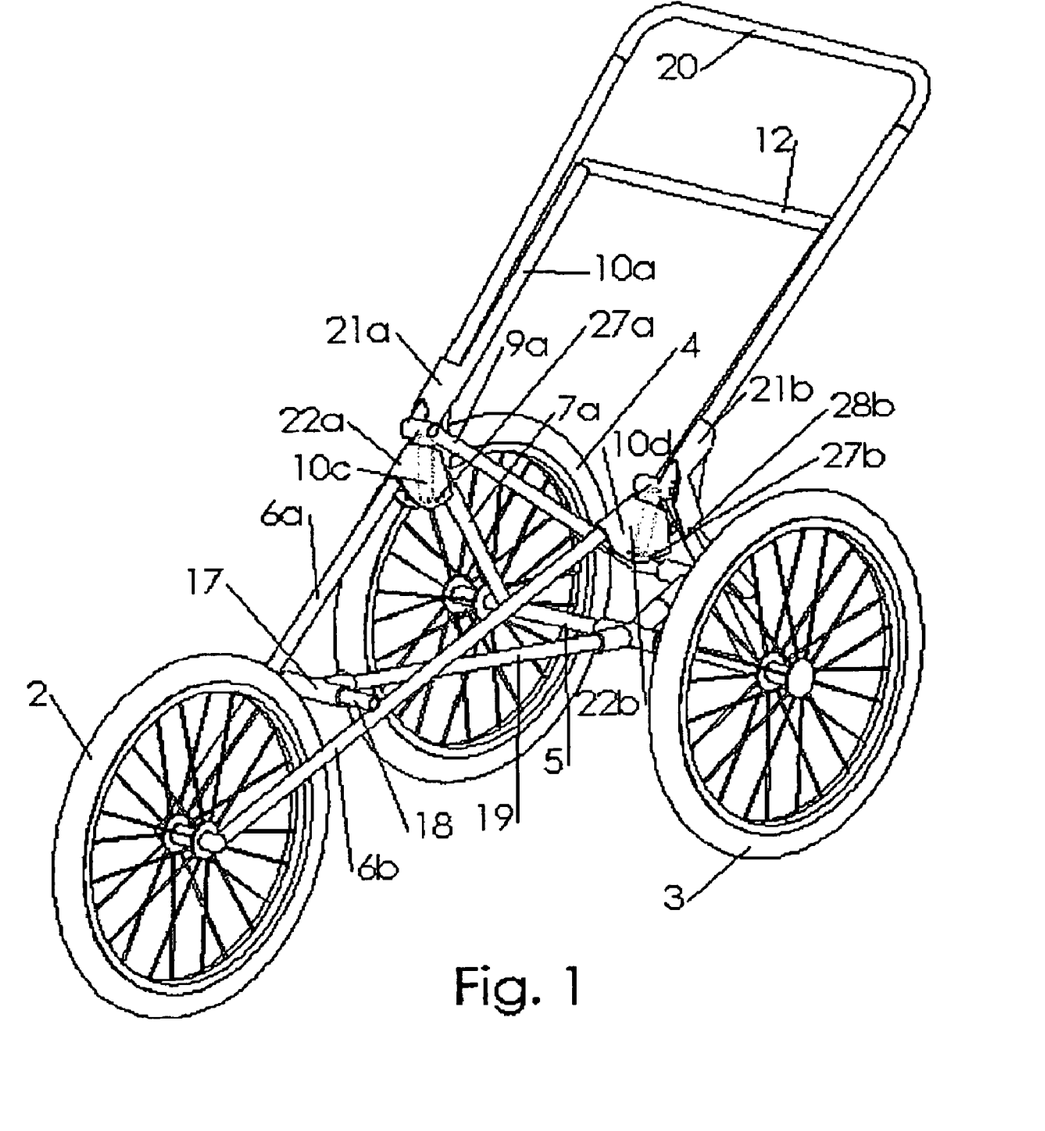
FIG. 1 is a perspective view of the reversible running stroller according to the invention.

The handlebar member 20 is pivotable from a first operative position as shown in FIG. 1, in which the bar portion is encircled within the handlebar support on one end and received on the angled tubes 7a and 7b, within the length of the saddle-shaped member opening.

The saddle-shaped member of the handlebar supports 21a and 21b, has a depth and length sufficient to enable opposing sidewalls to receive significant lengths of the angled tubes snugly and fully therein in the depth-wise and length-wise directions to provide stability at the coupling location so that wobbling and rattling is eliminated and the handlebar and the angled tubes act as an integral unit during use.

Figure 6:
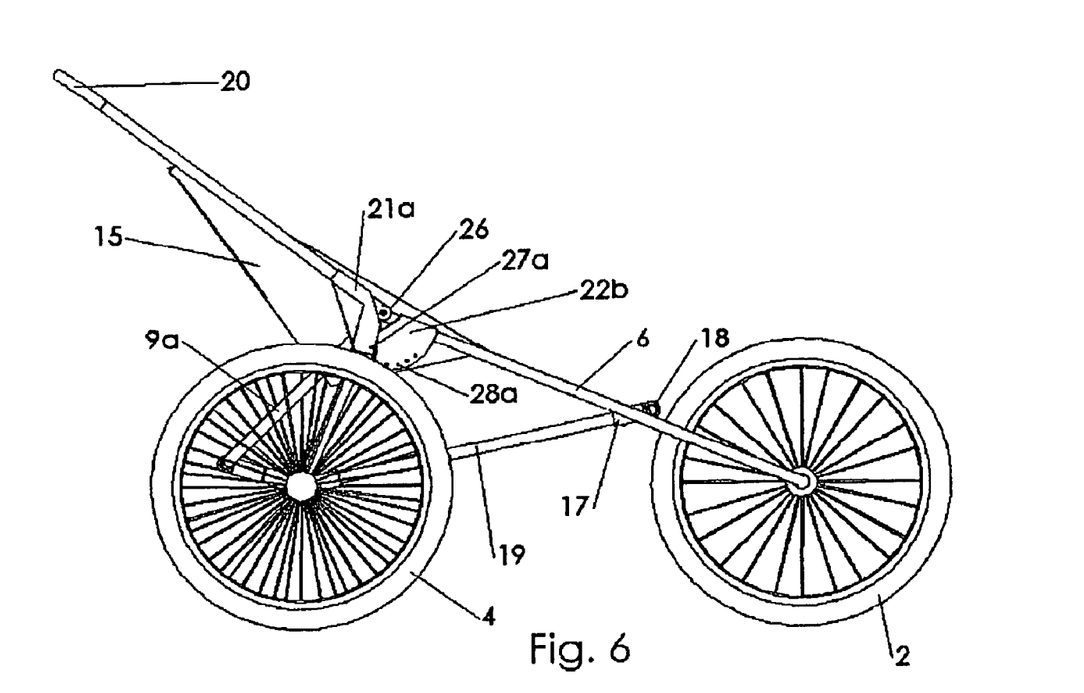
FIG. 6 a side elevational view of the collapsible frame of FIG. 1.
Figure 7:
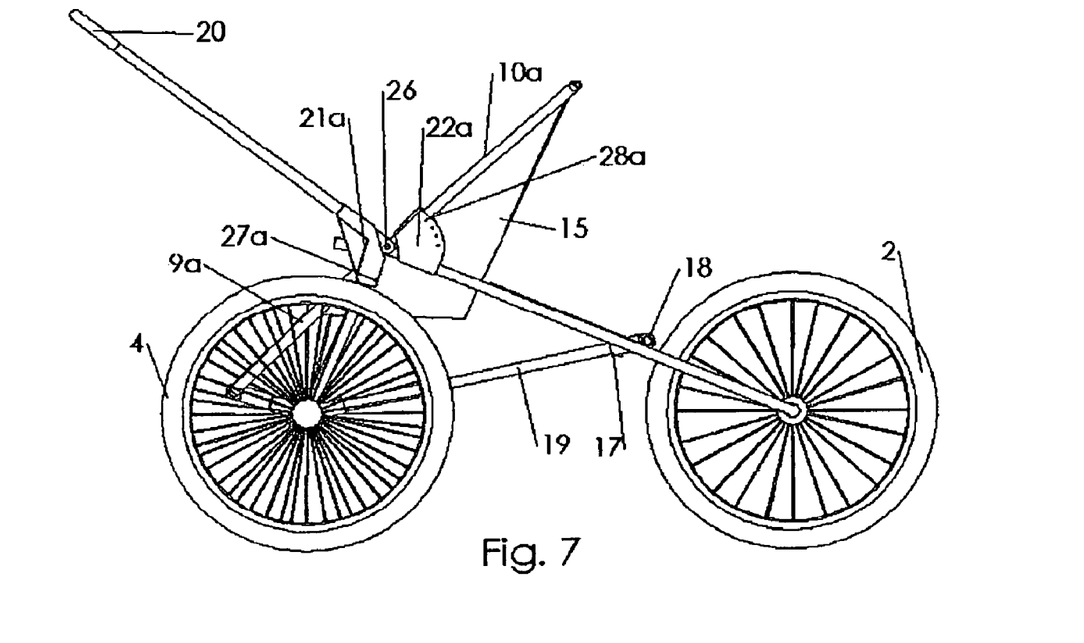
FIG. 7 a side elevational view of the collapsible frame of FIG. 1 in the rear facing seat configuration.

Referring to FIGS. 2, 6, and 7 attached to one seat support members 22a and 22b, the seat support members may be made of a tubular section and a saddle-shaped member. The tubular section of the seat support member encircles the lower handlebar tube 6. The end of the upper seat tube 10, is positioned in the bight portion of the saddle-shaped member and may be releasably attached thereto with e.g. removable pin. The seat support members 22a and 22b are formed with various apertures which receive a removable pin or the like to provide for varying angles between the lower handle bar tubes 6a and 6b and the upper seat tubes 10a and 10b. This varying position allows for different reclined positions of the upper seat in either the rear facing configuration FIGS. 2, 4, 7, and 8 or forward facing configuration FIGS. 1, 3, 5, and 6.

For the rear facing configuration, e.g. FIG. 2, the seat support members 22a and 22b, rotates about the lower handlebar tubes 6a and 6b and receive the upper seat member 10, in the bight thereof.

The pin that passes through the aperture of the interconnector 22, preferably achieves a snug fit and more preferably, the pin urges against the upper seat member 10, which urges it against the lower handlebar member 6.

The upper seat members 10a and 10b are connected at opposite ends of a span member 12.

In reference to FIGS. 1 through 4, the handlebar 20 is generally U-shaped with opposing sides converging toward the front. In the operative positions, the lower handlebar tubes 6a and 6b are likewise arranged to be in general alignment with the side arms of the upper handlebar portion 20 and converge toward the front wheel 2.

A span support member 18, can be formed of a tubular member or can be formed of a generally trapezoidally configured plate shaped injected plastic material of the like, as long as it is dimensioned for snugly attaching, such as by welding or riveting, to opposite sides of the handlebar tubes 6a, 6b at a point proximate the outer diameter of the front wheel 2, this span member 18 providing added front end stability.

The span support member 18, is pivotally connected to a single support member 19 by a releasably attached interconnector, 17. The interconnector 17, releasably attaches by a pin 29, (See FIGS. 3 and 4) to the single support member 19. The other end of the single support member 19, is pivotally connected by an interconnector 16, to the rear axle 5, and provides support generally in tension while in use.

Figure 8:
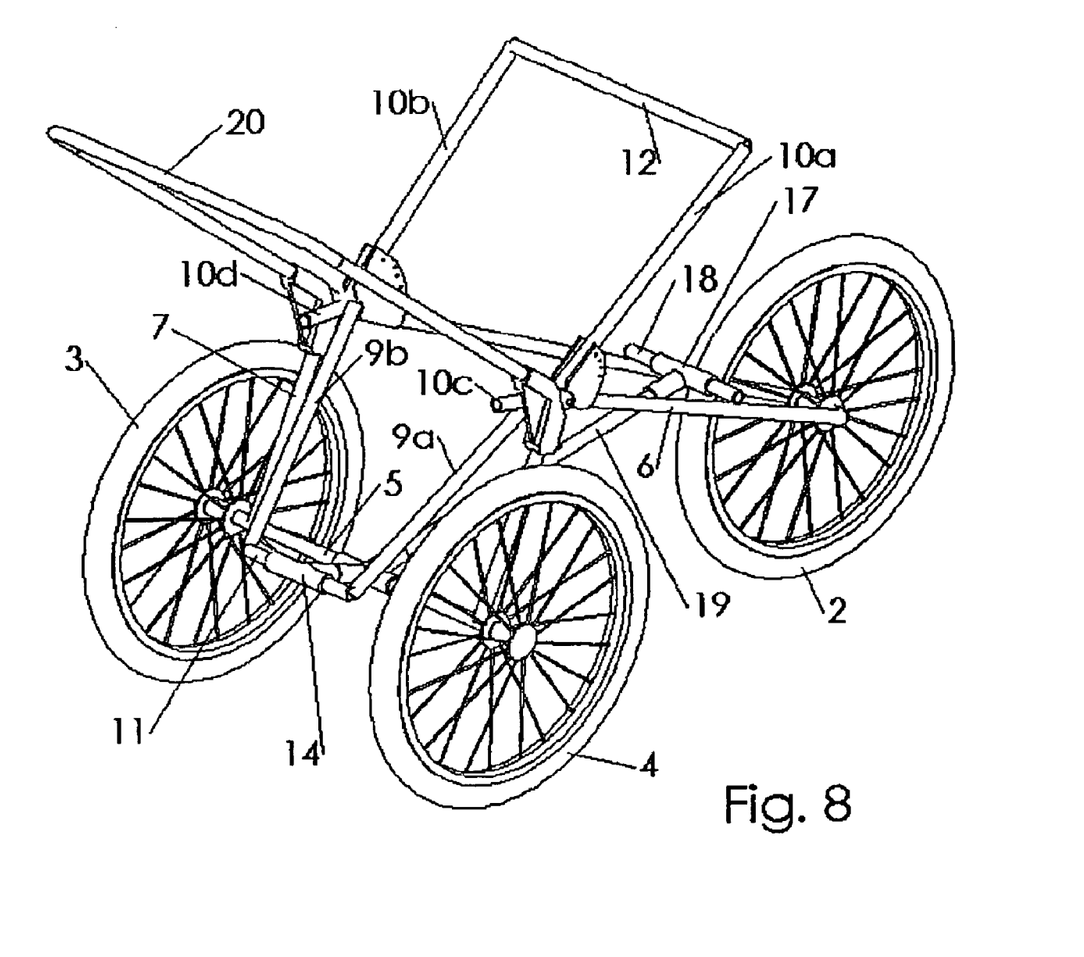
FIG. 8 is a rear perspective view of the frame of FIG. 1 in the rear facing seat configuration.

Best viewed in FIG. 8, the lower seat tubes 9a and 9b, are pivotally coupled at the upper end and coupled by rivets, screws, etc. to a support span 11, at the other end. Although the support span 11 can be formed of a generally trapezoidally configured plate shaped injected plastic material or the like, and is dimensioned for snugly attaching, such as by welding or riveting, to opposite sides of the lower seat portions 9a, 9b but it is shown as a single tubular member in FIGS. 3 and 8.

The support span 11, is pivotally coupled to an interconnector which is similar and preferably identical to the interconnector 14. The interconnector 14 is made preferably in a T-shape and in tubular form. The top tubular section thereof rotates about the support span 11, and couples with a support member in the lower tubular section. The lower tubular section is releasably attached by a pin to an interconnector 16. The interconnector 16 is rotatably attached to the rear axle.

Figure 9:
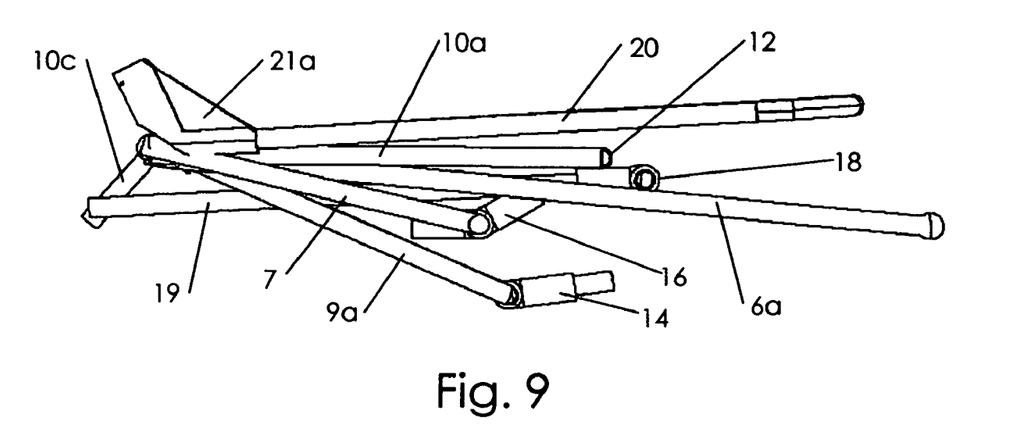
FIG. 9 a side elevational view of the collapsible frame of FIG. 1 in the collapsed or folded configuration with wheels dismounted.

Best viewed in FIG. 9, the frame is configured in its collapsed or folded state. The wheels are dismounted, pins removed, and releasably attached members are released. The single support member 19 is released from the interconnector 16 and the pivotally attached members are rotated as to generally overlay each other.

While the description has utilized directional references, such as up, down, front, rear, clockwise, etc., it is to be understood that these terms are utilized with reference to the orientations in the figures and are not intended to be limiting. The construction of the jogger stroller 40 is of aluminum can be of any suitable material with sufficient strength, which are all preferably of the same diameter, thus effecting economies of assembly. Furthermore, the exception of the handlebar portion 20, and the upper seat tube 10, all of the tubular stock consists of straight or linear lengths of material. The interconnectors and support members, such as 14, 16, 17, 21, 22, etc., are likewise formed of injected plastic of wall thickness sufficient to provide the required stability at the points of connection. In addition, the interconnectors which are configured to include pivot axes for one or more tubes are dimensioned and configured for providing support in the lengthwise directions of the tubes during operation of the stroller, with the spacing between opposing walls closely approximating the diameter of the tube sections therein for lateral as well a lengthwise stability.

In use, the stroller 40 is stable, convenient, and versatile. In side elevational view, as shown in FIG. 7, the sections which make up the handlebar form a generally straight line directed to the pivot 26, at an angle from the horizontal, and then the sections from the pivot 26, to the center of the front wheel 2, at a lesser angle to the horizontal. Thus, there is a definite angle between the axis of the rear handlebar portion 20, and the extension tubes 6a, 6b, however, optimum pushing force toward the axis of the front wheel is not compromised.

The upper seat members 10, form generally a straight line directed to the pivot 26, and continue at an angle of approximately 140 degrees relative to itself. The upper seat members 10, pivot about the corner of the bend. The bent shape sections 10c, 10d are the primary contact portion with the seat support members 22.

Furthermore, with the large diameter wheels 2-4, lateral stability is provided during movement.

In a preferred embodiment of the present invention, certain approximate dimensions are as follows:

Distance between front and rear axles—34".
Distance between rear wheels—22".
Dimensions unfolded (wheels off)—30" H, 43" L, 20" W.
Dimensions folded—30".times.20".times.6".
Handlebar height—39".
Wheel size—20" R, 20" F.

While there has been shown and described a preferred embodiment, other adaptations and modifications may be made without departing from the spirit and scope of the invention. Thus the reader can see that the running stroller of the invention provides a highly versatile arrangement that allows the rider to face the person pushing the stroller. It also allows the rider to face forward in the direction of travel.

While this written description contains many details and specificities, these should not be understood as limitations on the overall scope of the invention, but rather as an exemplification of one preferred embodiment thereof. Many other variations are possible. For example, the upper seat members 10, and the connecting span member 12, could be formed into a single U-shaped member. The lower seat member 9, and connecting span member 11 could also be a single U-shaped member. The color, size, and shape can be modified to allow for riders, single or multiple, of all sizes and preferences.

Accordingly, the scope of the invention should be determined not by the embodiments illustrated, but by the appended claims and their legal equivalents.

What is claimed is:

1. A stroller for use while walking or running, said stroller comprising:
   a plurality of wheels,
   a frame assembly,
   a reversing directional seat,
   said seat including an upper and two lower portions releasably attached to frame members,
   a rear axle assembly,
   locations on opposite ends of said axle assembly for removably supporting a pair of said wheels,
   a pair of angled support members having first ends thereof fixedly coupled to said axle assembly in proximate relation to the ends thereof and pivotally coupled at the other ends to a generally U-shaped handlebar member,
   a single support member having first end thereof pivotally coupled to said rear axle assembly proximate the center thereof in generally parallel relation,
   an interconnect member releasably coupled thereto the other end of said single support member to a first support member proximate to a third of said wheels,
   said first support member proximate a third of said wheels affixed to first and second handlebar tubes,
   handlebar support members supporting thereto the ends of said U-shaped handlebar member at a position for use and for said handlebar tubes and said single support member, on folding, to generally overlay one another,
   first ends of said first and second handlebar tubes being pivotally coupled at the ends of said U-shaped handlebar member,
   coupling means, affixed at the other end of first and second handlebar tubes, configured for supporting a third of said wheels,
   a pair of upper seat members pivotally coupled to the ends of said handlebar tubes,
   seat support pivotal members for pivotally supporting said upper seat members at varied reclined positions and reversed direction of said seat,
   a pair of lower seat members having first ends thereof pivotally coupled to the ends of said U-shaped handlebar member,
   a connecting member coupled to the other ends of said lower seat members,
   a second support member pivotally coupled to said connecting member at one end thereof and releasably coupled thereto the other end to said rear axle.

2. The stroller of claim 1 wherein said reversing directional seat contains upper seat members that can be rotated to enable a rear or forward facing arrangement and varied reclining angles for the rider.

* * * * *